(12) United States Patent
Harvey et al.

(10) Patent No.: US 10,970,575 B2
(45) Date of Patent: Apr. 6, 2021

(54) METHODS, APPARATUS AND SYSTEMS FOR BIOMETRIC PROCESSES

(71) Applicant: Cirrus Logic International Semiconductor Ltd., Edinburgh (GB)

(72) Inventors: Thomas Ivan Harvey, Edinburgh (GB); Vitaliy Sapozhnykov, Edinburgh (GB); Brenton Potter, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/833,935

(22) Filed: Mar. 30, 2020

(65) Prior Publication Data

US 2020/0342246 A1 Oct. 29, 2020

Related U.S. Application Data

(60) Provisional application No. 62/839,957, filed on Apr. 29, 2019.

(51) Int. Cl.
| | |
|---|---|
| *H04R 5/02* | (2006.01) |
| *G06K 9/03* | (2006.01) |
| *G06K 9/00* | (2006.01) |
| *G06F 21/32* | (2013.01) |

(52) U.S. Cl.
CPC .............. *G06K 9/036* (2013.01); *G06F 21/32* (2013.01); *G06K 9/00885* (2013.01)

(58) Field of Classification Search
CPC ...................................................... H04R 5/02
See application file for complete search history.

(56) References Cited

U.S. PATENT DOCUMENTS

| | | | |
|---|---|---|---|
| 5,787,187 A | 7/1998 | Bouchard et al. | |
| 10,104,458 B2 * | 10/2018 | Boesen | A61B 5/22 |
| 2008/0262382 A1 | 10/2008 | Akkermans et al. | |
| 2009/0061819 A1 | 3/2009 | Coughlan et al. | |
| 2016/0212522 A1 * | 7/2016 | Lee | B60W 50/14 |
| 2017/0214997 A1 | 1/2017 | Kaller et al. | |

(Continued)

FOREIGN PATENT DOCUMENTS

| | | |
|---|---|---|
| KR | 20160099232 A | 8/2016 |
| WO | 2006054205 A1 | 5/2006 |

(Continued)

OTHER PUBLICATIONS

Combined Search and Examination Report under Sections 17 and 18(3), UKIPO, Application No. GB1908804.6, dated Dec. 11, 2019.

(Continued)

*Primary Examiner* — Olisa Anwah
(74) *Attorney, Agent, or Firm* — Jackson Walker L.L.P.

(57) ABSTRACT

Described embodiments relate to a method operable in a biometric authentication system. The method comprises initiating generation of an acoustic stimulus for application to a user's ear; and determining a quality measure of a response signal to the acoustic stimulus. Responsive to determining that the quality measure is inadequate for performing a biometric process, the method comprises one or more of: (i) modifying one or more properties of the acoustic stimulus to improve a signal to noise ratio, SNR, of the response signal and (ii) cancelling the effect of noise from outside the ear on the response signal of the user's ear to the acoustic stimulus to improve the SNR of the response signal.

20 Claims, 14 Drawing Sheets

(56) References Cited

U.S. PATENT DOCUMENTS

| | | |
|---|---|---|
| 2018/0376234 A1 | 12/2018 | Petrank |
| 2019/0012445 A1 | 1/2019 | Lesso et al. |
| 2019/0012446 A1 | 1/2019 | Lesso |
| 2019/0075388 A1* | 3/2019 | Schrader .............. H04R 1/1008 |
| 2019/0095653 A1 | 3/2019 | Kurosawa |

FOREIGN PATENT DOCUMENTS

| | | |
|---|---|---|
| WO | 2014061578 A1 | 4/2014 |
| WO | 2018213746 A1 | 11/2018 |
| WO | 2018034178 A1 | 6/2019 |
| WO | 2018198310 A1 | 2/2020 |

OTHER PUBLICATIONS

Combined Search and Examination Report under Sections 17 and 18(3), UKIPO, Application No. GB1908797.2, dated Nov. 14, 2019.
Combined Search and Examination Report under Sections 17 and 18(3), UKIPO, Application No. GB1908803.8, dated Dec. 11, 2019.
Combined Search and Examination Report under Sections 17 and 18(3), UKIPO, Application No. GB1908799.8, dated Nov. 20, 2019.

* cited by examiner

METHODS, APPARATUS AND SYSTEMS FOR BIOMETRIC PROCESSES

The present disclosure claims priority to U.S. Provisional Patent Application Ser. No. 62/839,957, filed Apr. 29, 2019, which is incorporated by reference herein in its entirety.

TECHNICAL FIELD

Embodiments of the disclosure relate to methods, apparatus and systems for biometric processes, and particularly to methods, apparatus and systems for improving biometric processes involving the measured response of a user's ear to an acoustic stimulus.

BACKGROUND

It is known that the acoustic properties of a user's ear, whether the outer parts (known as the pinna or auricle), the ear canal or both, differ substantially between individuals and can therefore be used as a biometric to identify the user. One or more loudspeakers or similar transducers positioned close to or within the ear generate an acoustic stimulus, and one or more microphones similarly positioned close to or within the ear detect the acoustic response of the ear to the acoustic stimulus. One or more features may be extracted from the response signal, and used to characterize an individual.

For example, the ear canal is a resonant system, and therefore one feature which may be extracted from the response signal is the resonant frequency of the ear canal. If the measured resonant frequency (i.e. in the response signal) differs from a stored resonant frequency for the user, a biometric algorithm coupled to receive and analyse the response signal may return a negative result. Other features of the response signal may be similarly extracted and used to characterize the individual. For example, the features may comprise one or more mel frequency cepstrum coefficients. More generally, the transfer function between the acoustic stimulus and the measured response signal (or features of the transfer function) may be determined, and compared to a stored transfer function (or stored features of the transfer function) which is characteristic of the user.

One problem associated with ear biometric systems is that the signal to noise ratio of the measured response signal is typically quite low as the biometric features of the signal are relatively weak. This problem can be exacerbated depending on a number of factors. For example, the user may be present in a noisy environment. For example, earphones used to acquire the ear biometric data may be poorly fitted to the user's ear (e.g. inserted too far into the user's ear, or not sufficiently inserted). For example, the bandwidth of the acoustic stimulus may be limited (some audio sources are relatively narrowband). For example, the user may be generating noise in the canal or headset due to own voice, chewing sounds and handling of the headset.

SUMMARY

According to one aspect of the present disclosure, there is provided a method operable in a biometric authentication system, the method comprising: initiating generation of an acoustic stimulus for application to a user's ear; determining a quality measure of a response signal to the acoustic stimulus; and responsive to determining that the quality measure is inadequate for performing a biometric process, modifying one or more properties of the acoustic stimulus to improve a signal to noise ratio, SNR, of the response signal.

For example, modifying one or more properties of the acoustic stimulus may comprise one or more of:
(i) modifying the gain of the acoustic stimulus;
(ii) increasing the duration of the acoustic stimulus;
(iii) applying an additional instance of the acoustic stimulus;
(iv) shifting the pitch of the acoustic stimulus such that content of the response signal is better aligned with the user's ear canal resonances;
(v) applying masking noise to the user's ear;
(vi) amplifying ambient noise and/or user voice via hear through mode or sidetone path;
(vii) using a masking model to add additional content to the acoustic stimulus that us inaudible to the user and increasing the level of the acoustic stimulus;
(viii) adding harmonic content to the acoustic stimulus and increasing the level of the acoustic stimulus; and
(ix) adding content to the acoustic stimulus inaudible frequencies and increasing the level of the acoustic stimulus.

In some embodiments, the method further comprises cancelling the effect of noise from outside the ear on the response signal of the user's ear to the acoustic stimulus.

According to another aspect of the present disclosure, there is provided a method operable in a biometric authentication system, the method comprising: initiating generation of an acoustic stimulus for application to a user's ear; determining a quality measure of a response signal to the acoustic stimulus; and responsive to determining that the quality measure is inadequate for performing a biometric process, cancelling the effect of noise from outside the ear on the response signal of the user's ear to the acoustic stimulus to improve a signal to noise ratio, SNR, of the response signal.

For example, cancelling the effect of noise from outside the ear on the response signal may comprise cancelling an out-of-ear microphone signal from an in-ear microphone signal.

The quality measure may be or comprise one of: an estimated signal-to-noise ratio, SNR, of the response signal, an estimated signal level of the response signal, and an estimated noise level of the response signal.

In some embodiments, determining that the quality measure is inadequate comprises comparing the response signal to one or more of: (i) a pre-determined ear canal response of the user; and (ii) hearing characteristics of the user. In some embodiments, determining that the quality measure is inadequate may comprise determining masked signal levels of the response signal at one or more frequencies, wherein the masked signal levels correspond with signal levels of the acoustic stimulus that are inaudible to the user. In some embodiments, determining that the quality measure is inadequate may comprise comparing one or more parameters associated with quality of the response signal to one or more corresponding parameters extracted from a pre-determined ear canal response of the user. In some embodiments, determining that the quality measure is inadequate for performing a biometric process may comprise comparing the quality measure with a target quality measure.

The method may further comprise responsive to determining that a difference between the determined quality measure and the target quality measure is positive and greater than a threshold gain metric, reducing the gain of the acoustic stimulus and responsive to determining that the difference between the determined quality measure and the target quality measure is negative and greater than a threshold gain metric, increasing the gain of the acoustic stimulus.

In some embodiments, determining the quality measure may comprise determining a noise level indicative of a noise level in the user's ear. The noise level may be a predefined value. Alternatively, determining the noise level in the user's ear may comprise determining an in-ear signal when no acoustic stimulus is being applied to the user's ear. For example, the in-ear signal is determined once the application of the acoustic stimulus has stopped. Determining the noise level in the user's ear may comprise determining an in-ear signal when the acoustic stimulus is being applied to the user's ear. Determining the noise level in the user's ear may further comprise cancelling the acoustic stimulus from the in-ear signal. Determining the noise level in the user's ear may comprise determining the noise level in the user's ear based on an out-of-ear signal when no acoustic stimulus is being applied to the user's ear and a transfer function between an ear entrance and an internal microphone. For example, the out-of-ear signal may be determined once the application of the acoustic stimulus has stopped. Determining the noise level in the user's ear may comprise determining the noise level in the user's ear based on an out-of-ear signal when the acoustic stimulus is being applied to the user's ear and a transfer function between an ear entrance and an internal microphone. Determining the noise level in the user's ear may further comprise cancelling the acoustic stimulus from the out of-ear signal.

In some embodiments, the method may comprise responsive to determining one or more of: (i) a relatively high noise situation and (ii) wind condition, determining the noise level in the user's ear based on an in-ear signal. In some embodiments, the method may comprise responsive to determining one or more of: (i) a relatively low noise situation and (ii) noise from the user's mouth, determining the noise level in the user's ear based on an out-of-ear signal.

The out-of-ear signal may be derived from an external microphone external to the user's ear. The in-ear signal may be derived from an internal microphone internal to the user's ear.

Determining the quality measure may comprise determining a signal level indicative of the response signal. The signal level may be a predefined value. Alternatively, determining the signal level indicative of the response signal may comprise analysing the acoustic stimulus and compensating for the transfer function between the acoustic stimulus an in-ear transducer. In some embodiments, the method may further comprise compensating for the effects of fit of an earbud comprising the transducer in the user's ear. Determining the signal level indicative of the response signal may comprise determining the response signal of the user's ear to the acoustic stimulus.

In some embodiments, the method may comprise responsive to determining a relatively high noise situation, cancelling the effect of noise from outside the ear on the response signal of the user's ear to the acoustic stimulus. In some embodiments, responsive to determining one or more of: (i) a relatively low noise situation and (ii) the transfer function of the in-ear transducer being variable, determining the signal level indicative of the response signal based on the determined response signal of the user's ear to the acoustic stimulus.

In some embodiments, the acoustic stimulus may comprise a quiet period, a ramp-up period and a probe period, and determining the quality measure may comprise determining a noise level from a corresponding quiet period of the response signal, and determining a signal and noise level from a corresponding probe period of the response signal.

In some embodiments, the acoustic stimulus may comprise non-zero spectral content associated with a first set of one or more frequency ranges and zero spectral content associated with a second set of one or more frequency ranges and determining the quality measure may comprise determining a noise level from the response signal at the second set of one or more frequency ranges, and determining a signal and noise level from the response signal at the first set of one or more frequency ranges.

In some embodiments, the method further comprises responsive to determining that the quality measure is adequate for performing the biometric process, extracting one or more features from the measured response to perform the biometric process. The biometric process may be a biometric authentication process or a biometric enrolment process or an on-ear detection process or an in-ear detection process.

The acoustic stimulus may be pre-recorded audio or streamed audio.

According to another aspect of the present disclosure, there is provided an electronic apparatus, comprising processing circuitry and a non-transitory machine-readable medium storing instructions which, when executed by the processing circuitry, cause the electronic apparatus to implement any of the described methods.

According to another aspect of the present disclosure, there is provided a non-transitory machine-readable medium storing instructions which, when executed by processing circuitry, cause an electronic apparatus to implement any of the described methods.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Embodiments of the disclosure relate to methods, apparatus and systems for biometric processes, and particularly to methods, apparatus and systems for improving biometric processes involving the measured response of a user's ear to an acoustic stimulus.

Described embodiments mitigate poor signal to noise ratio of the measured response signal by dynamically modifying properties of the acoustic stimulus (for example amplitude, spectral shape, duration) such that the signal to noise ratio of the measured response signal is sufficiently high to extract desired biometric features with sufficient quality, thereby improving performance of processes, such as biometric processes or on-ear detection processes.

As noted above, ear biometric data may be acquired by the generation of an acoustic stimulus, and the detection of an acoustic response of the ear to the acoustic stimulus. One or more features may be extracted from the response signal, and used to characterize the individual.

The acoustic stimulus may be generated and the response measured using a personal audio device. As used herein, the term "personal audio device" is any electronic device which is suitable for, or configurable to, provide audio playback substantially to only a single user. Some examples of suitable personal audio devices are shown in FIGS. 1a to 1e.

Figure 1A:
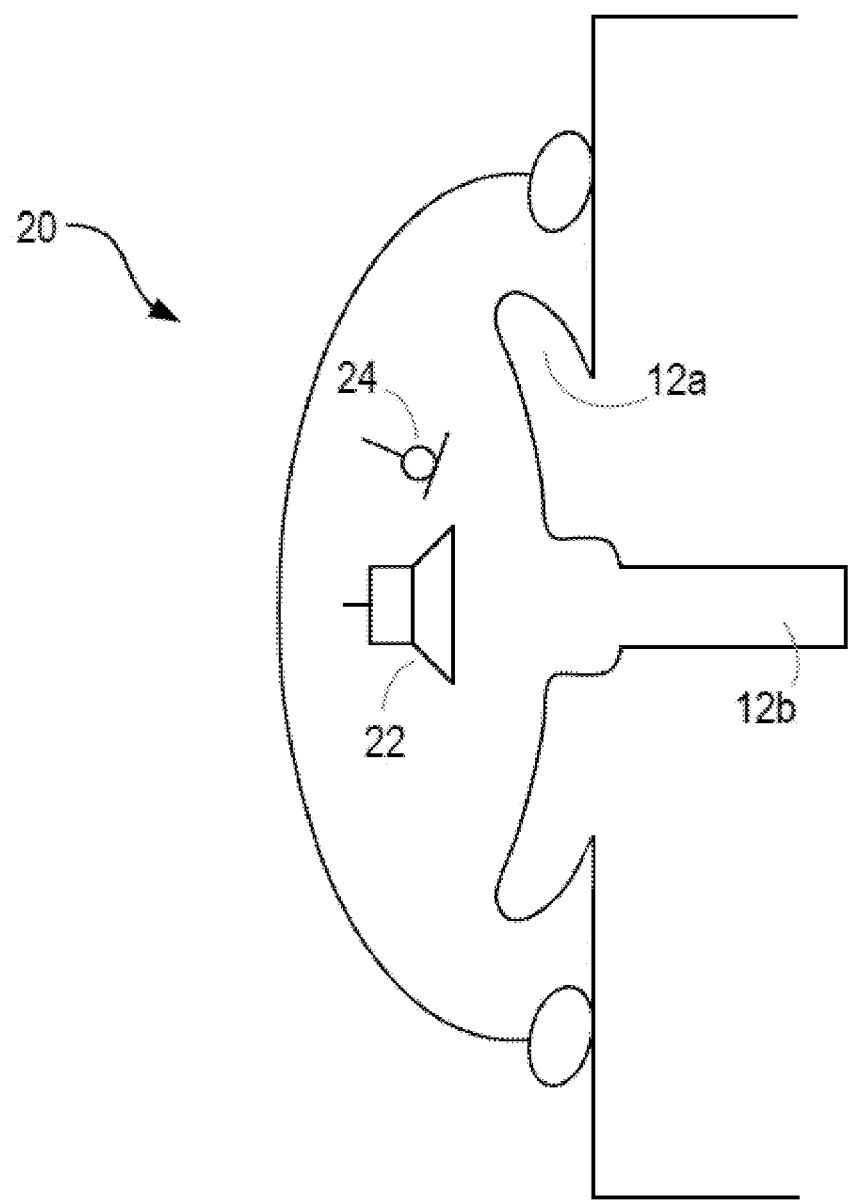
FIGS. 1a to 1e show examples of personal audio devices.

FIG. 1a shows a schematic diagram of a user's ear, comprising the (external) pinna or auricle 12a, and the (internal) ear canal 12b. A personal audio device 20 comprising a circum-aural headphone is worn by the user over the ear. The headphone comprises a shell which substantially surrounds and encloses the auricle 12a, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone, and arranged to generate acoustic signals towards the user's ear and particularly the ear canal 12b. The headphone further comprises one or more microphones 24, also positioned on the internal surface of the headphone, arranged to detect acoustic signals within the internal volume defined by the headphone, the auricle 12a and the ear canal 12b.

The headphone may be able to perform active noise cancellation, to reduce the amount of noise experienced by the user of the headphone. Active noise cancellation operates by detecting a noise (i.e. with a microphone), and generating a signal (i.e. with a loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1a may therefore form part of an active noise cancellation system, for example, as an error microphone.

Figure 1B:
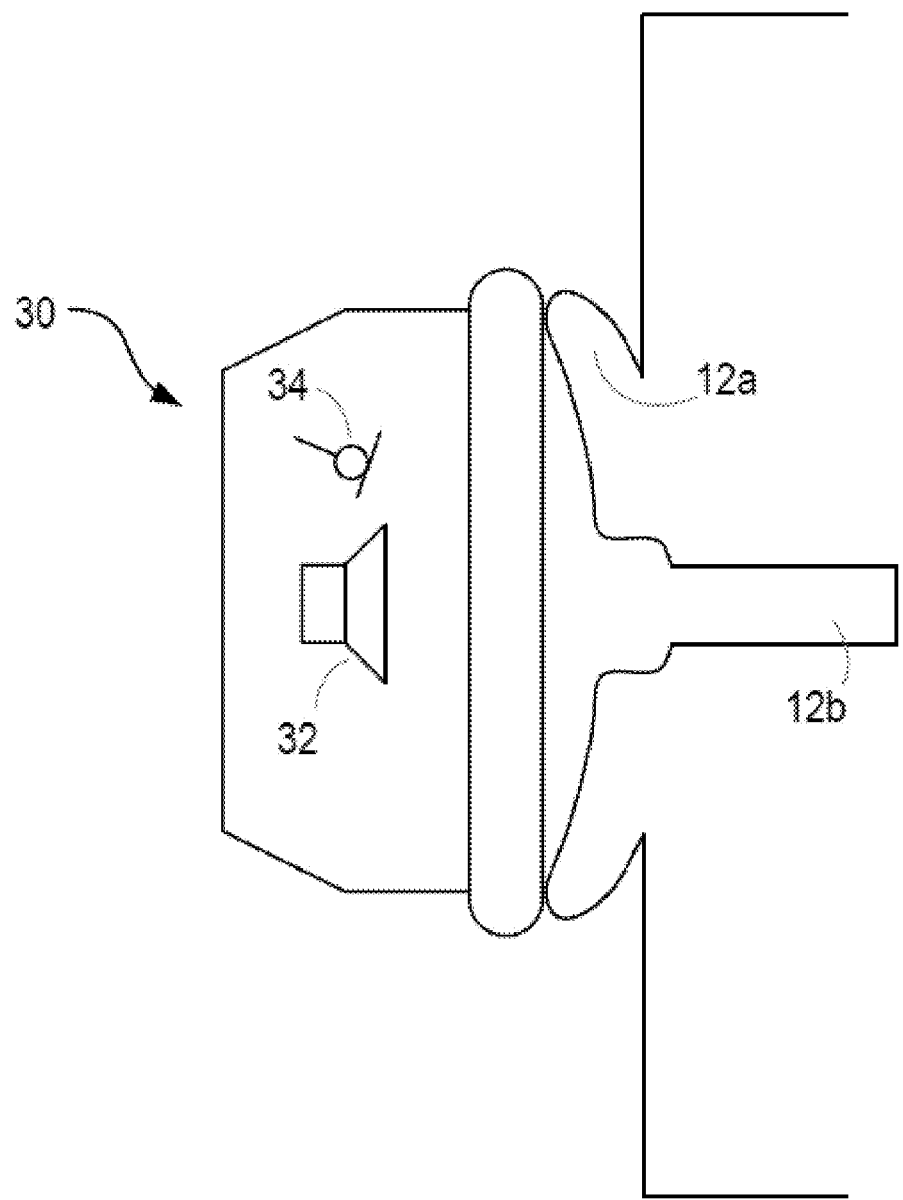

FIG. 1b shows an alternative personal audio device 30, comprising a supra-aural headphone. The supra-aural headphone does not surround or enclose the user's ear, but rather sits on the auricle 12a. The headphone may comprise a cushion or padding to lessen the impact of environmental noise. As with the circum-aural headphone shown in FIG. 1a, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
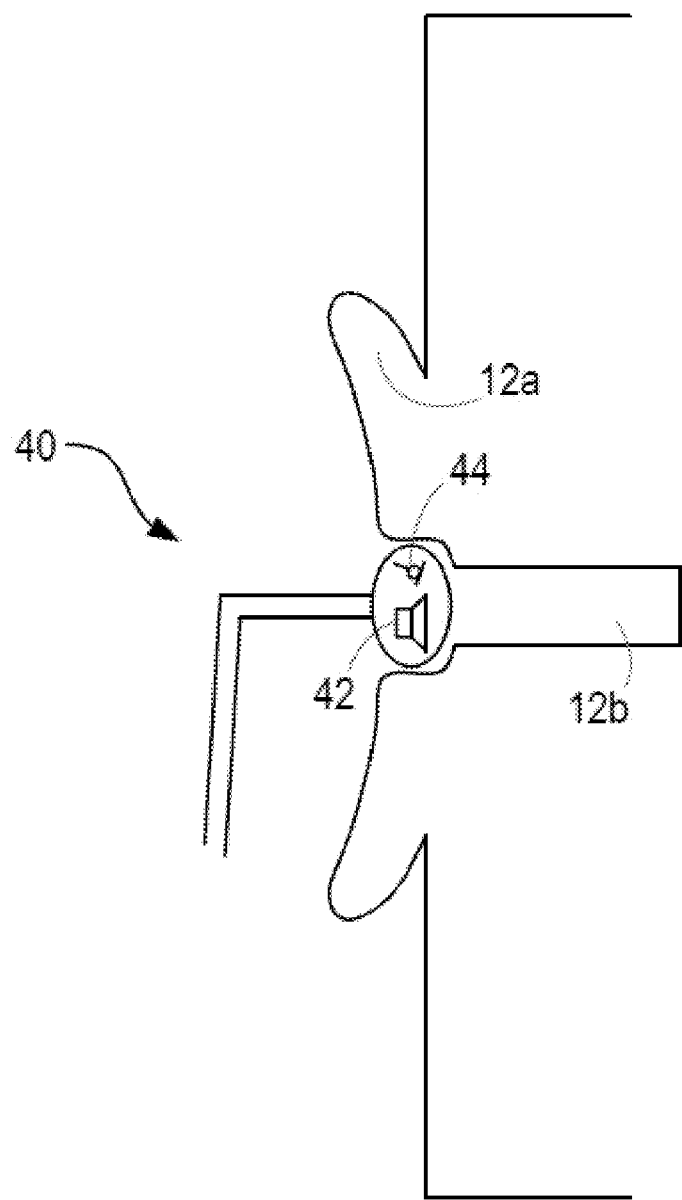

FIG. 1c shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12b.

As with the devices shown in FIGS. 1a and 1b, the intra-concha headphone comprises one or more loudspeakers 42 and one or more microphones 44, which may form part of an active noise cancellation system.

Figure 1D:
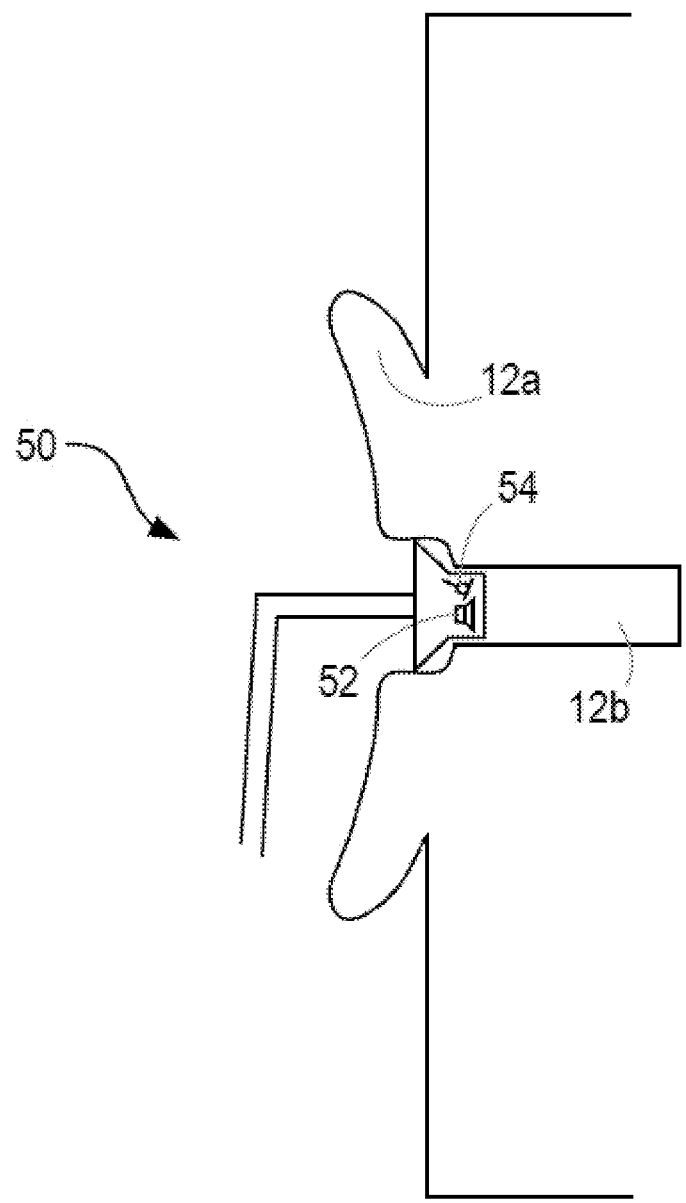

FIG. 1d shows a further alternative personal audio device 50, comprising an in-ear headphone (or earphone), insert headphone, or ear bud. This headphone is configured to be partially or totally inserted within the ear canal 12b, and may provide a relatively tight seal between the ear canal 12b and the external environment (i.e. it may be acoustically closed or sealed). The headphone may comprise one or more loudspeakers 52 and one or more microphones 54, as with the others devices described above, and these components may form part of an active noise cancellation system.

As the in-ear headphone may provide a relatively tight acoustic seal around the ear canal 12b, external noise (i.e. coming from the environment outside) detected by the microphone 54 is likely to be low.

Figure 1E:
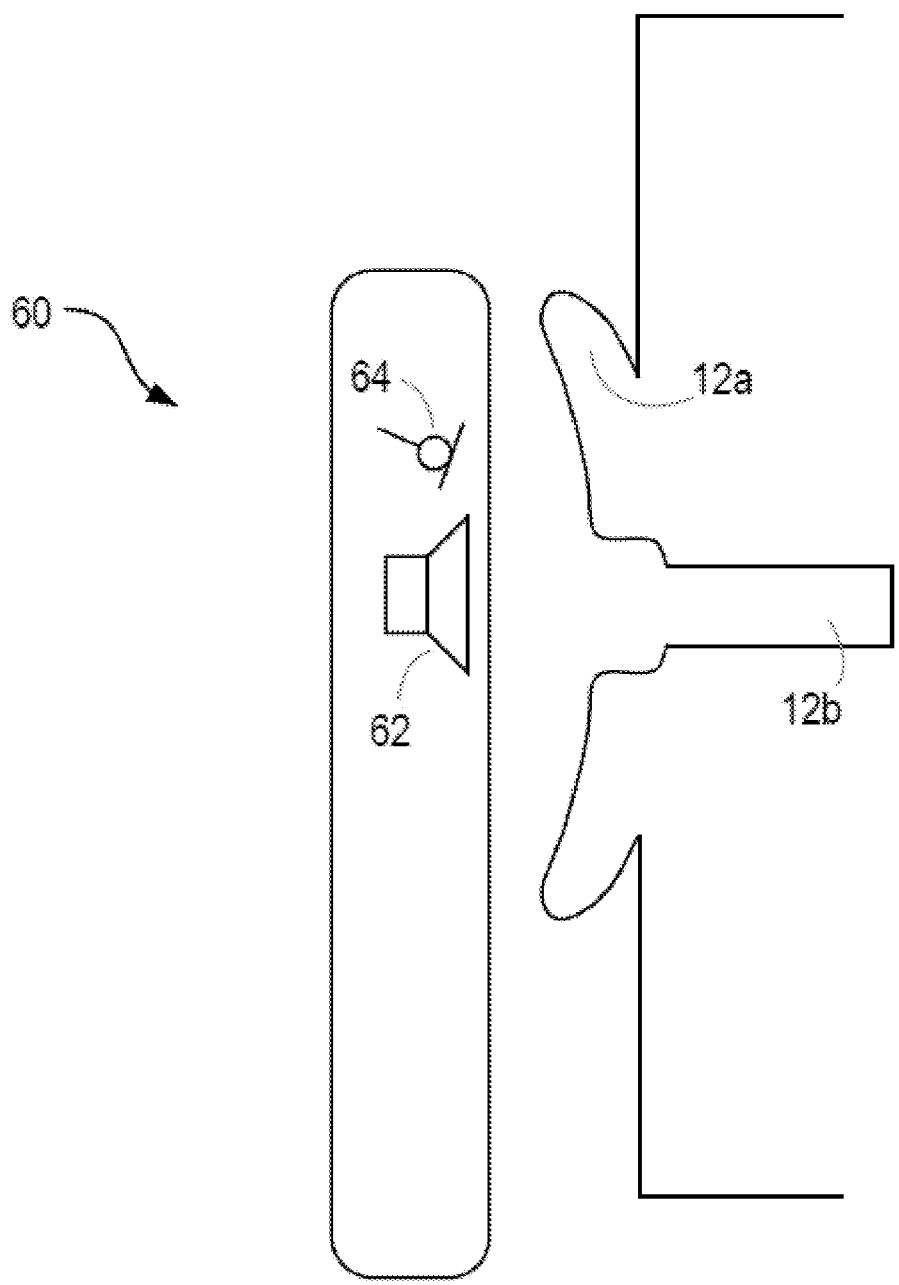

FIG. 1e shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that an acoustic stimulus applied to the ear via the one or more loudspeakers 62 generates a response from the ear which can be detected by the one or more microphones 64. As with the other devices, the loudspeaker(s) 62 and microphone(s) 64 may form part of an active noise cancellation system.

All of the personal audio devices described above thus provide audio playback to substantially a single user in use. Each device comprises one or more loudspeakers and one or more microphones, which may be utilized to generate biometric data related to the frequency response of the user's ear. The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna. The acoustic stimulus may be sonic (for example in the audio frequency range of say 20 Hz to 20 kHz) or ultra-sonic (for example greater than 20 kHz or in the range 20 kHz to 50 kHz) or near-ultrasonic (for example in the range 15 kHz to 25 kHz) in frequency. In some examples the microphone signal may be processed to measure received signals of the same frequency as that transmitted.

Another biometric marker may comprise otoacoustic noises emitted by the cochlear in response to the acoustic stimulus waveform. The otoacoustic response may comprise a mix of the frequencies in the input waveform. For example, if the input acoustic stimulus consists of two tones at frequencies f1 and f2, the otoacoustic emission may include a component at frequency 2*f1−f2. The relative power of frequency components of the emitted waveform has been shown to be a useful biometric indicator. In some examples therefore the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks.

Depending on the construction and usage of the personal audio device, the measured response may comprise user-specific components, i.e. biometric data relating to the auricle 12a, the ear canal 12b, or a combination of both the auricle 12a and the ear canal 12b. For example, the circumaural headphones shown in FIG. 1a will generally acquire data relating to the auricle 12a and potentially also the ear canal 12b. The insert headphones shown in FIG. 1d will generally acquire data relating only to the ear canal 12b.

One or more of the personal audio devices described above (or rather, the microphones within those devices) may be operable to detect bone-conducted voice signals from the user. That is, as the user speaks, sound is projected away from the user's mouth through the air. However, acoustic vibrations will also be carried through part of the user's skeleton or skull, such as the jaw bone. These acoustic vibrations may be coupled to the ear canal 12b through the jaw or some other part of the user's skeleton or skull, and detected by the microphone. Lower frequency sounds tend to experience a stronger coupling than higher frequency sounds, and voiced speech (i.e. that speech or those phonemes generated while the vocal cords are vibrating) is coupled more strongly via bone conduction than unvoiced speech (i.e. that speech or those phonemes generated while the vocal cords are not vibrating). The in-ear headphone 50 may be particularly suited to detecting bone-conducted speech owing to the tight acoustic coupling around the ear canal 12b.

All of the devices shown in FIGS. 1a to 1e and described above may be used to implement aspects of the disclosure.

Figure 2:
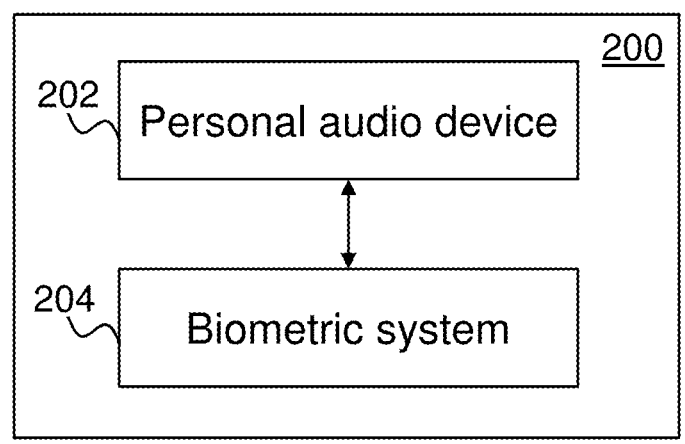
FIG. 2 shows an arrangement according to embodiments of the disclosure.

FIG. 2 shows an arrangement 200 according to embodiments of the disclosure. The arrangement 200 comprises a personal audio device 202 and a biometric system 204. The personal audio device 202 may be any device which is suitable for, or configurable to provide audio playback to substantially a single user. The personal audio device 202 generally comprises one or more loudspeakers, and one or more microphones which, in use, are positioned adjacent to or within a user's ear. The personal audio device 202 may be wearable, and comprise headphones for each of the user's ears. Alternatively, the personal audio device 202 may be operable to be carried by the user, and held adjacent to the user's ear or ears during use. The personal audio device 202 may comprise headphones or a mobile phone handset, as described above with respect to any of FIGS. 1a to 1e. The biometric system 204 may, in some embodiments, form part of the personal audio device 202 itself. Alternatively, the system 204 may form part of an electronic host device (e.g. an audio player) to which the personal audio device 202 is coupled, through wires or wirelessly. In yet further embodiments, operations of the biometric system 204 may be distributed between circuitry in the personal audio device 202 and the electronic host device.

The biometric system 204 is coupled to the personal audio device 202 and is operative to control the personal audio device 202 to acquire biometric data, which is indicative of the individual using the personal audio device 202.

The personal audio device 202 generates an acoustic stimulus for application to the user's ear, and detects or measures the response of the ear to the acoustic stimulus. For example, the acoustic stimulus may be in the sonic range, or ultra-sonic. In some embodiments, the acoustic stimulus may have a flat frequency spectrum over a relevant frequency range, or be preprocessed in such a way that those frequencies that allow for a good discrimination between individuals are emphasized (i.e. have a higher amplitude than other frequencies). The measured response corresponds to the reflected signal received at the one or more microphones, with certain frequencies being reflected at higher amplitudes than other frequencies owing to the particular response of the user's ear.

According to embodiments of the disclosure, the personal audio device 202 is further operable to determine whether a signal to noise ratio (SNR) of the response signal is adequate for performing a biometric process, such as feature extraction for authentication, or on-ear detection. In response to determining that the SNR of the response signal is inadequate, the personal audio device 202 may be operable to modify one or more properties of the acoustic stimulus to improve the SNR of the response signal, as discussed in more detail below.

The biometric system 204 may send suitable control signals to the personal audio device 202, so as to initiate the acquisition of biometric data, and receive data from the personal audio device 202 corresponding to the measured response. The biometric system 204 is operable to extract one or more features from the measured response and utilize those features as part of a biometric process.

The biometric process may determine whether a response measured at the personal audio device 202 is a response induced from an ear, to thereby detect whether or not a headset, headphone or earphone or the like is located in or on the ear of a user. Alternatively, the biometric process may involve biometric enrolment or authentication based on the measured response. Enrolment comprises the acquisition and storage of biometric data which is characteristic of an individual. In the present context, such stored data may be known as an "ear print". Authentication (sometimes referred to as verification) comprises the acquisition of biometric data from an individual, and the comparison of that data to the stored ear prints of one or more enrolled or authorised users. A positive comparison (i.e. a determination that the acquired data matches or is sufficiently close to a stored ear print) results in the individual being authenticated. For example, the individual may be permitted to carry out a restricted action, or granted access to a restricted area or device. A negative comparison (i.e. a determination that the acquired data does not match or is not sufficiently close to a stored ear print) results in the individual not being authenticated. For example, the individual may not be permitted to carry out the restricted action, or granted access to the restricted area or device.

Figure 3:
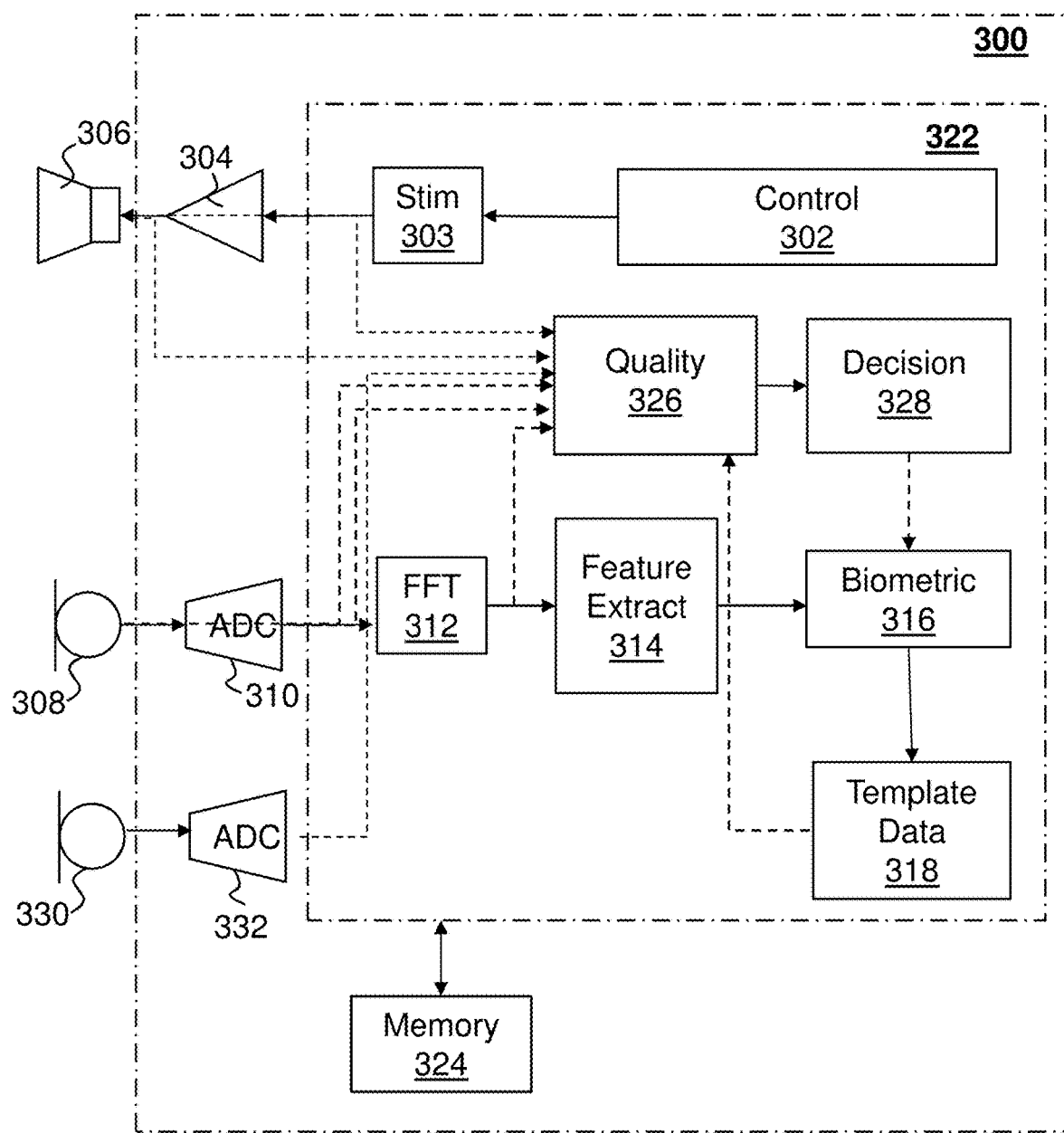
FIG. 3 shows a system according to embodiments of the disclosure.

FIG. 3 shows a system 300 according to embodiments of the disclosure.

The system 300 comprises processing circuitry 322, which may comprise one or more processors, such as a central processing unit or an applications processor (AP), or a digital signal processor (DSP).

The one or more processors may perform methods as described herein on the basis of data and program instructions stored in memory 324. Memory 324 may be provided as a single component or as multiple components or co-integrated with at least some of processing circuitry 322. Specifically, the methods described herein can be performed in processing circuitry 322 by executing instructions that are stored in non-transient form in the memory 324, with the program instructions being stored either during manufacture of the system 300 or personal audio device 202 or by upload while the system or device is in use.

The processing circuitry 322 comprises a stimulus generator module 303, which is coupled directly or indirectly to an amplifier 304, which in turn is coupled to a loudspeaker 306. The stimulus generator module 303 generates an electrical audio signal and provides the electrical audio signal to the amplifier 304, which amplifies it and provides the amplified signal to the loudspeaker 306. The loudspeaker 306 generates a corresponding acoustic signal, which is output to the user's ear (or ears). The audio signal may be sonic or ultra-sonic, for example. The audio signal may have a flat frequency spectrum, or be preprocessed in such a way that those frequencies that allow for a good discrimination between individuals are emphasized (i.e. have a higher amplitude than other frequencies).

As noted above, the audio signal may be output to all or a part of the user's ear (i.e. the auricle 12a or the ear canal 12b of the user as described with reference to FIGS. 1a to 1e). With the personal device 202 fitted to the user's ear, the audio signal is reflected off the ear, and the reflected signal (or echo signal) is detected and received by a microphone 308. The reflected signal thus comprises data, which is characteristic not only of an ear in general, but more specifically of the individual's ear. The reflected signal is thus suitable for use as a biometric, either to determine that the personal audio device 202 is in or on the user's ear or to determine a specific characteristic of the user's ear for use in biometric enrolment or authentication.

The reflected signal is passed from the microphone 308 to an analogue-to-digital converter (ADC) 310, where it is converted from the analogue domain to the digital domain. Of course, in alternative embodiments the microphone 308 may be a digital microphone and produce a digital data signal (which does not therefore require conversion to the digital domain).

The signal is detected by the microphone 308 in the time domain. The features extracted for the purposes of the biometric process may be in the time domain. However, in some embodiments, the features extracted for the purposes of the biometric process may be in the frequency domain (in that it is the frequency response of the ear which is characteristic). The system 300 may therefore comprise a Fourier transform module 312, which converts the reflected signal to the frequency domain. For example, the Fourier transform module 312 may implement a fast Fourier transform (FFT).

The system 300 may further comprise a microphone 330, and associated an analogue-to-digital converter (ADC) 332 where necessary. The microphone 330 may be an external or out-of-ear microphone, which may be used for noise signal determinations, for example, as discussed in more detail below.

The transformed signal is then passed to a feature extract module 314, which extracts one or more features of the transformed signal for use in a biometric process (e.g. biometric enrolment, biometric authentication, on-ear detect (OED), in-ear detect, etc). For example, the feature extract module 314 may extract the resonant frequency of the user's ear. For example, the feature extract module 314 may extract one or more mel frequency cepstrum coefficients. Alternatively, the feature extract module 314 may determine the frequency response of the user's ear at one or more predetermined frequencies, or across one or more ranges of frequencies.

The extracted feature(s) are passed to a biometric module 316, which performs a biometric process on them. For example, the biometric module 316 may determine whether the extracted features(s) indicate that the signal received at the microphone 308 contains a reflection from an ear in general, as opposed to open space for example. One or more extracted feature(s) may be compared to corresponding features in a stored ear print 318. The stored ear print 318 may in the instance be a generic ear print representative of the general population. In another example, the biometric module 316 may perform a biometric enrolment, in which the extracted features (or parameters derived therefrom) are stored as part of biometric data 318, which is characteristic of the individual (i.e. as an ear print). The biometric data 318 may be stored within the system 300 or remote from the system 300 (and accessible securely by the biometric module 316). In another example, the biometric module 316 may perform a biometric authentication, and compare the one or more extract features to corresponding features in a stored ear print 318 (or multiple stored ear prints). In this example, the stored ear print 318 may comprise ear prints obtained specifically from authorised users, for example during biometric enrolment. Again, the stored ear print 318 may be stored within the system 300 or remote from the system 300 (and accessible securely by the biometric module 316).

The biometric module 316 generates a biometric result (which may be the successful or unsuccessful generation of an ear print, and/or the successful or unsuccessful authentication and/or the successful or unsuccessful detection of an ear for the purposes of on-ear or in-ear detect). The biometric module 316 may then output the result to control module 302.

In some embodiments the stimulus waveforms may be tones of predetermined frequency and amplitude. In other embodiments the stimulus generator 303 may be configurable to apply music to the loudspeaker 306, e.g. normal playback operation, and the feature extract module may be configurable to extract the response or transfer function from whatever signal components the stimulus waveform contains.

Thus in some embodiments the feature extract module 314 may be designed with foreknowledge of the nature of the stimulus, for example knowing the spectrum of the applied stimulus signal, so that the response or transfer function may be appropriately normalised. In other embodiments the feature extract module 314 may comprise a second input to monitor the stimulus (e.g. playback music) and hence provide the feature extract module 314 with information about the stimulus signal or its spectrum so that the feature extract module 314 may calculate the transfer function from the stimulus waveform stimulus to received acoustic waveform from which it may derive the desired feature parameters. In the latter case, the stimulus signal may also pass to the feature extract module 314 via the FFT module 312.

According to embodiments of the disclosure, the system 300 further comprises a quality measure module 326, which is operative to determine the quality of a response signal to an acoustic stimulus. For example, the quality measure module 326 may determine an estimated signal-to-noise ratio, SNR, of the response signal, an estimated signal level and/or an estimated noise level associated with the response signal.

The system 300 further comprises a decision module 328, which is operative to determine whether the determined quality measure is adequate or inadequate for performing a biometric process, such as feature extraction for authentication, or on-ear detection. In response to determining that the quality measure of the response signal is inadequate, the decision module 328 is operable to instruct the control module 302 to modify one or more properties of the acoustic stimulus to improve the SNR of the response signal. Alternatively, or in addition, the decision module 328 may be operable to instruct the control module 302 to cancel the effect of noise from outside the ear on the response signal of the user's ear to the acoustic stimulus to improve the SNR of the response signal.

The acoustic stimulus may be known, for example, may be based on a pre-recorded sound, or may be unknown, for example, may be based on streamed sound. The acoustic stimulus may have a defined duration or may be continuous.

In some embodiments, where the acoustic stimulus is based on a pre-recorded sound, the quality measure module 326 may determine the response signal or more specifically, the response signal level, by analysing the acoustic stimulus and compensating for a transfer function between the acoustic stimulus and an in-ear transducer, such as loudspeaker 306. The quality measure module 326 may compensate for the effects of fit of a personal audio device comprising the transducer relative to the user's ear when determining the response signal level. Thus, the determination of the response signal level could be estimated as a pre-processing step in advance of providing the acoustic stimulus to the user's ear.

Where the acoustic stimulus unknown a priori, for example, is based on streamed audio, or indeed is known a priori, the quality measure module 326 may determine the response signal by analysing the measured or captured response signal. For example, this may involve real time processing of the measured response signal.

The quality measure module 326 may determine a noise level from an internal or external microphone, such as microphone 308 or 330, and/or by analysing the measured response signal to the acoustic signal as discussed in more detail below. For example, this may involve real time processing of noise signals and/or the measured response signal.

In some embodiments, the quality measure module 326 determines a SNR metric, which may be based on: (i) measured signal and noise levels; (ii) a measured signal level and an assumed constant or predefined noise level or (iii) an estimated or measured noise level and an assumed constant or predefined signal level.

The quality measure module 326 may be coupled to receive signals corresponding to the output of one or more of: the microphone 308; the microphone 330; the ADC 310, the Fourier transform module 312; and the feature extract module 314; and to determine a SNR of a response signal associated with the acoustic stimulus.

The quality measure module 326 provides a quality measure or metric to the decision module 328, which determines whether the response signal, based on the determined quality metric, is inadequate for performing a biometric process. For example, the decision module 328 may determine whether the response signal is adequate to perform a biometric process, such as feature extraction for authentication or on ear detection, based on a determination of one or more of: the signal level, the noise level and the SNR.

In some embodiments, the decision module 328 may determine whether or not the quality measure is adequate by comparing the quality measure with a target measure, and responsive to determining that the quality measure is less than the target quality measure, modifying one or more properties of the acoustic stimulus, or cancel the effect of noise from outside the ear on the response signal. For example, where the quality measure is SNR, the decision module 328 may reduce the gain of the acoustic stimulus if it is determined that a difference between the determined SNR and the target SNR is positive and greater than a threshold gain metric, and may increase the gain of the acoustic stimulus if it is determined that the difference between the determined SNR and the target SNR is negative and greater than a threshold gain metric.

The decision module 328 may determine that the quality measure is inadequate by comparing the estimated or measured response signal to a pre-determined ear canal response of the user and determining that the estimated or measured response signal differs from the pre-determined ear canal response by greater than a threshold value.

The decision module 328 may determine that the quality measure is inadequate by comparing the estimated or measured response signal with hearing characteristics of the user, such as hearing thresholds or an audiogram.

The decision module 328 may determine masked signal levels of the response signal at one or more frequencies, wherein the masked signal levels correspond with signal levels of the acoustic stimulus that are inaudible to the user.

The decision module 328 may determine whether or not the quality measure is inadequate by comparing one or more parameters associated with quality of the response signal to one or more corresponding parameters extracted from a pre-determined ear canal response of the user.

In some embodiments, the decision module 328 outputs an indication to the control module 302 to modify one or more properties of the acoustic stimulus to improve the SNR of the response signal. In response to receiving the indication from the decision module 328, the control module 302 modifies one or more properties of the acoustic stimulus.

The control module 302 may modify the gain of the acoustic stimulus. For example, the control module 302 may add additional content to the acoustic stimulus that is inaudible to the user, such as by using a masking model, and increase the level of the acoustic stimulus. The control module 302 may add harmonic content to the acoustic stimulus and increase the level of the acoustic stimulus. The control module 302 may add content to the acoustic stimulus inaudible frequencies and increase the level of the acoustic stimulus.

The control module 302 may modify the duration of the acoustic stimulus. For example, the control module 302 may increase the duration of the acoustic stimulus. In some embodiments, the control module 302 may apply or play an additional instance of the acoustic stimulus In some embodiments, the control module 302 may shift the pitch of the acoustic stimulus such that content of the response signal is better aligned with the user's ear canal resonances. For example, a user's ear canal response may be analysed using a broadband stimulus and data indicative of the stored user's ear canal resonances during enrolment of the user in the biometric system 300.

In some embodiments, the control module 302 may cancel the effect of noise from outside the ear on the response signal of the user's ear to the acoustic stimulus, for example, when it is determined that the user is in a relatively high noise situation.

The control module 302 may apply masking noise to the user's ear. For example, the masking noise may be shaped to match spectral shape of the background noise.

The control module 302 may amplify ambient noise and/or user voice via hear through mode or sidetone path.

In some embodiments, alternatively or in addition to outputting an indication to the control module 302 modify one or more properties of the acoustic stimulus, the decision module 328 outputs an indication to the control module 302 to cancel the effect of noise from outside the ear on the response signal of the user's ear to the acoustic stimulus, for example, when it is determined that the user is in a relatively high noise situation and/or there is a significant amount of environmental noise in the ear canal.

In some embodiments, the decision module 328 may output an indication as to whether the response signal is adequate for extracting features for use in the biometric process. In the illustrated embodiment, the indication is output to the feature extract module 314, which can then halt extraction a feature extraction process which is already underway, prevent a feature extraction process from being carried out, or alter the result of a feature extraction process which was previously carried out. In other embodiments, the indication may be output to the biometric module 316 itself, which can then halt a biometric process which is already underway, prevent a biometric process from being carried out, or alter the result of a biometric process which was previously carried out. Alternatively, the indication may be output to a separate module, such as the processing circuitry 322 or other module (not illustrated), which ensures that the result of a biometric process is not respected if the features are invalidated.

The system 300 may be provided within a personal audio device (such as the personal audio device 202), or may be distributed across multiple devices. In the former case, all functional blocks other than the loudspeaker 306 and the microphone 308 may be provided on one or more integrated circuits. In the latter case, one or more (or all) of the functional blocks other than the loudspeaker 306 and the microphone 308 may be provided in a host electronic device (e.g. on one or more integrated circuits). In either case, the microphone may also be co-integrated with one or more functional blocks, such as one or more of the ADC 310, the Fourier transform module 312, and the feature extract module 314.

Figure 4A:
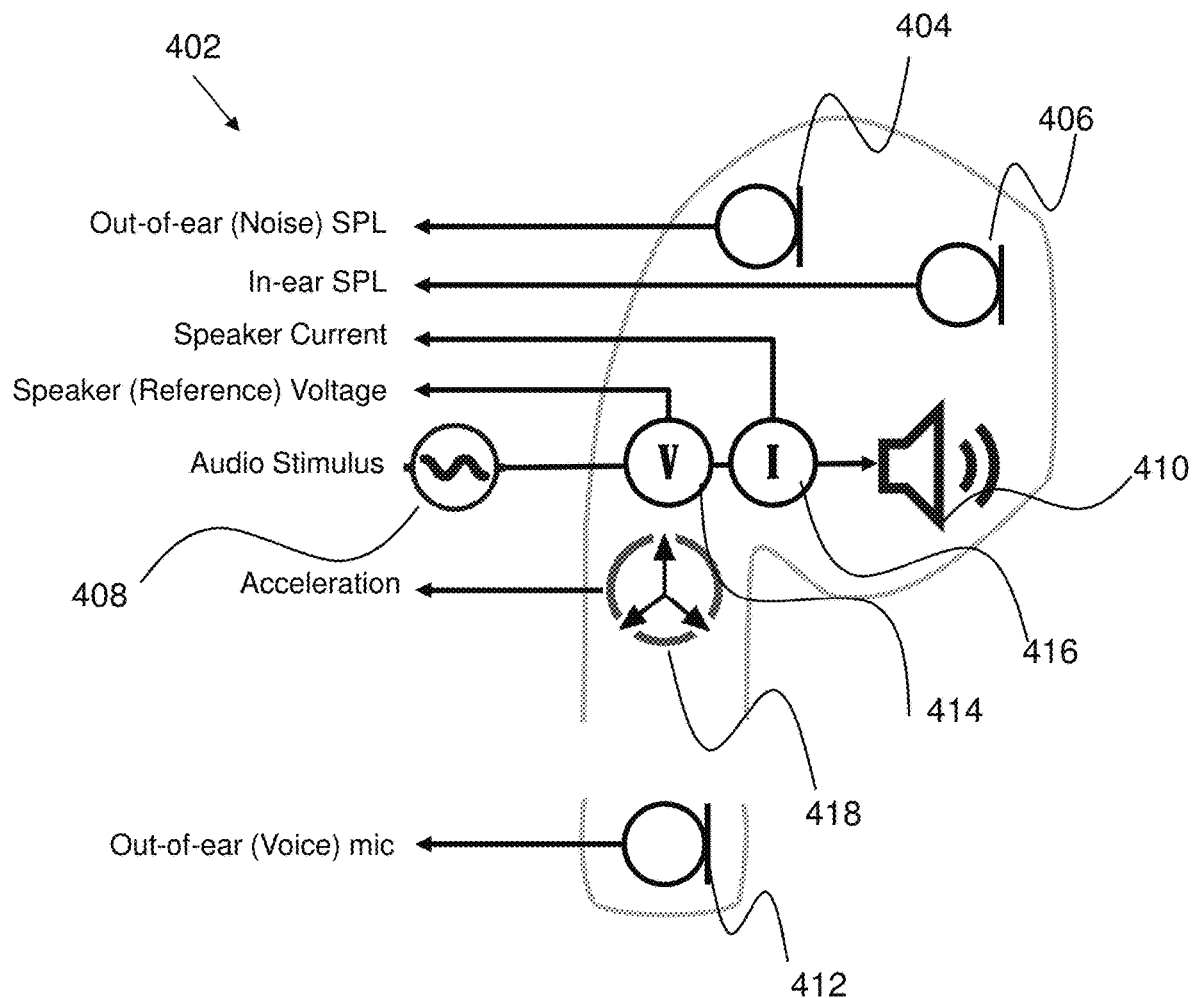
FIG. 4A shows an example personal audio device.
Figure 4B:
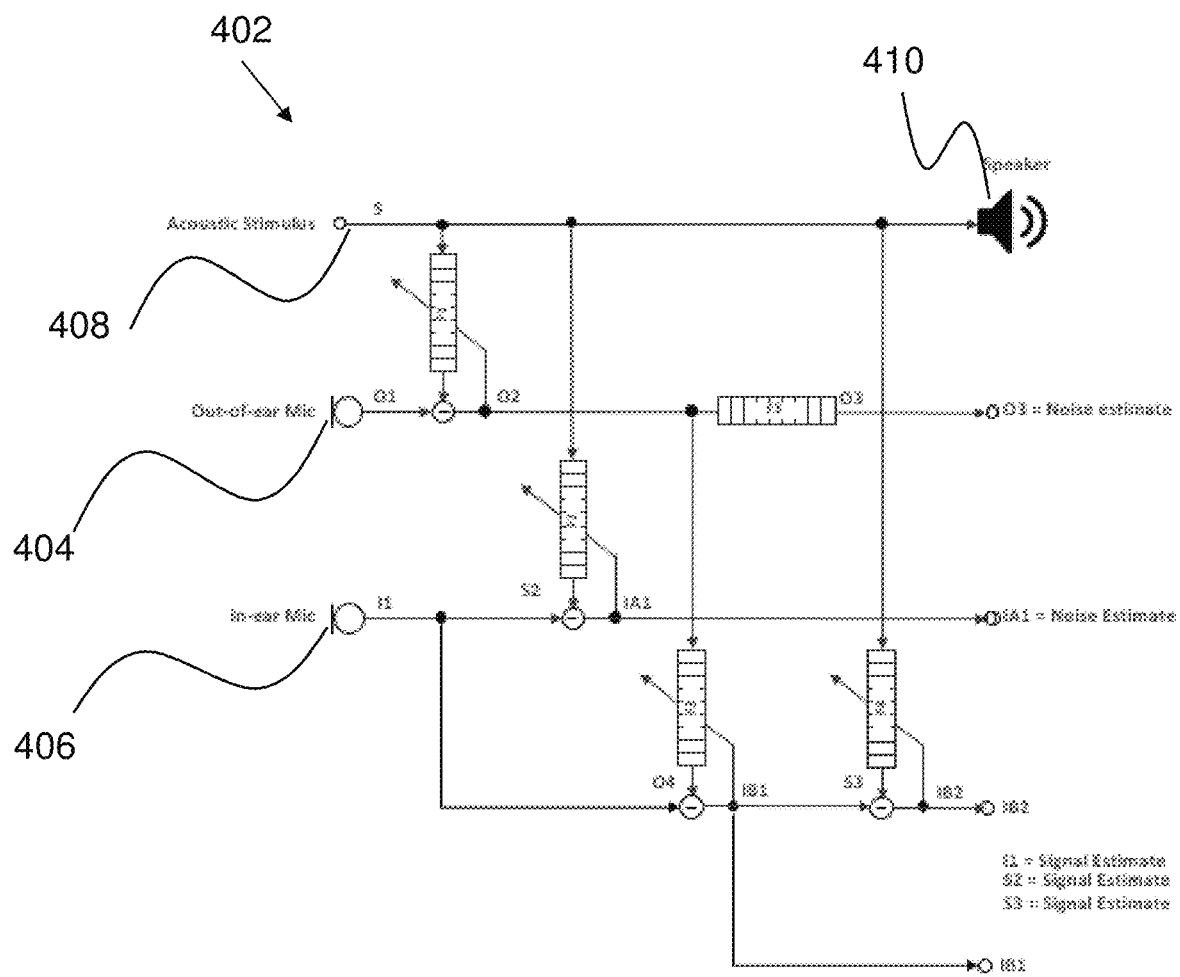
FIG. 4B shows a schematic of a signal path through the personal audio device of FIG. 4A, according to embodiments of the disclosure.

FIG. 4A shows an example personal audio device 402 and FIG. 4B shows a schematic of a signal path through the personal audio device 402. As illustrated, the personal audio device 402 comprises an out-of-ear (noise) microphone 404, an in-ear microphone 406, an acoustic stimulus generator 408 and a transducer 410, the acoustic stimulus generator 408 configured to provide a generated acoustic stimulus to the transducer 410, and an out-of-ear (voice) microphone 412. As shown, the personal audio device 402 may also include a voltmeter 414 and an ammeter 416 for determining transducer voltage and current measurements and an accelerometer 418.

Referring to FIG. 4B, F1 represents a transfer function between the acoustic stimulus generator 408 and the out-of-ear microphone 404, F2 and F4 represent a transfer function between the acoustic stimulus generator 408 and the in-ear microphone 406, F3 represents a transfer function between the out-of-ear microphone 404 and the in-ear microphone 406.

As discussed above, the quality measure module 326 may be configured to determine or estimate a quality measure of the response signal by determining one or more of: a signal level indicative of the response signal and a noise level indicative of a noise level in the user's ear.

In some embodiments, the quality measure module 326 may determine the noise level in the user's ear by determining an in-ear signal when no acoustic stimulus is being applied to the user's ear. For example, the quality measure module 326 may receive an in-ear signal from the in-ear microphone 406 (arranged to be positioned internal to the user's ear). In some embodiments, the in-ear signal may be determined as the noise signal once the application of the acoustic stimulus by the acoustic stimulus generator 408 has stopped.

In some embodiments, the quality measure module 326 may determine the noise level in the user's ear by determining an in-ear signal when the acoustic stimulus is being applied to the user's ear. For example, the quality measure module 326 may receive an in-ear signal from the in-ear microphone 406 (arranged to be positioned internal to the user's ear). In some embodiments, the acoustic stimulus is first cancelled from the in-ear signal to obtain a better estimate of the noise level.

In some embodiments, the quality measure module 326 may determine the noise level in the user's ear based on an out-of-ear signal when no acoustic stimulus is being applied to the user's ear, such as from out-of-ear microphone 404 (arranged to be positioned external to the user's ear), and the transfer function between an ear entrance and an internal microphone (passive loss), F3. For example, this transfer function may be determined by cancelling the out-of-ear microphone signal from the in-ear microphone signal, or by subtracting the spectrum of out-of-ear mic from the in-ear-mic. The quality measure module 326 may determine the out-of-ear signal once the application of the acoustic stimulus has stopped.

In some embodiments, the quality measure module 326 may determine the noise level in the user's ear based on an out-of-ear signal when the acoustic stimulus is being applied to the user's ear, such as from out-of-ear microphone 404 (arranged to be positioned external to the user's ear), and the transfer function between an ear entrance and an internal microphone (passive loss), F3. For example, this transfer function may be determined by cancelling the out-of-ear microphone signal from the in-ear microphone signal, or by subtracting the spectrum of out-of-ear mic from the in-ear-mic. In some embodiments, the acoustic stimulus is first cancelled from the out-of-ear signal to obtain a better estimate of the noise level.

According to some embodiments, the quality measure module 326 may determine the noise level based on the in-ear signal or on the out-of-ear signal depending on whether certain conditions are deemed to apply. For example, if the user is in a relatively high noise situation and/or there is a lot of wind present, which may for example be flagged to the quality measure module 326 from a noise or wind detector (not shown), the quality measure module 326 may select to determine the user's ear based on the in-ear signal. On the other hand, if the acoustic stimulus is playing and/or the user is in a relatively low noise situation and/or noise is determined as coming from the user's mouth, for example, via a voice activity detector, the quality measure module 326 may select to determine the user's ear based on the out-of-ear signal.

The quality measure module 326 may determine the signal level indicative of the response signal by analysing the acoustic stimulus to be applied and compensating for the transfer function between the acoustic stimulus an in-ear transducer (F2/F4), for example, as a pre-processing step in advance of providing the acoustic stimulus to the user's ear. The transfer function may for example, be derived at design time or may be computed at run time. In some embodiments, the quality measure module 326, may determine the response signal by analysing the measured or captured response signal, for example, in real time.

In some embodiments, if the quality measure module 326 determines that the user is in a relatively low noise situation, or that the transfer function of the in-ear transducer is likely to be variable, for example, due to a poor fit of the personal audio device 202 to the user's ear, the quality measure module 326 may select to determine the signal level indicative of the response signal based on the measured response signal of the user's ear to the acoustic stimulus.

Figure 5:
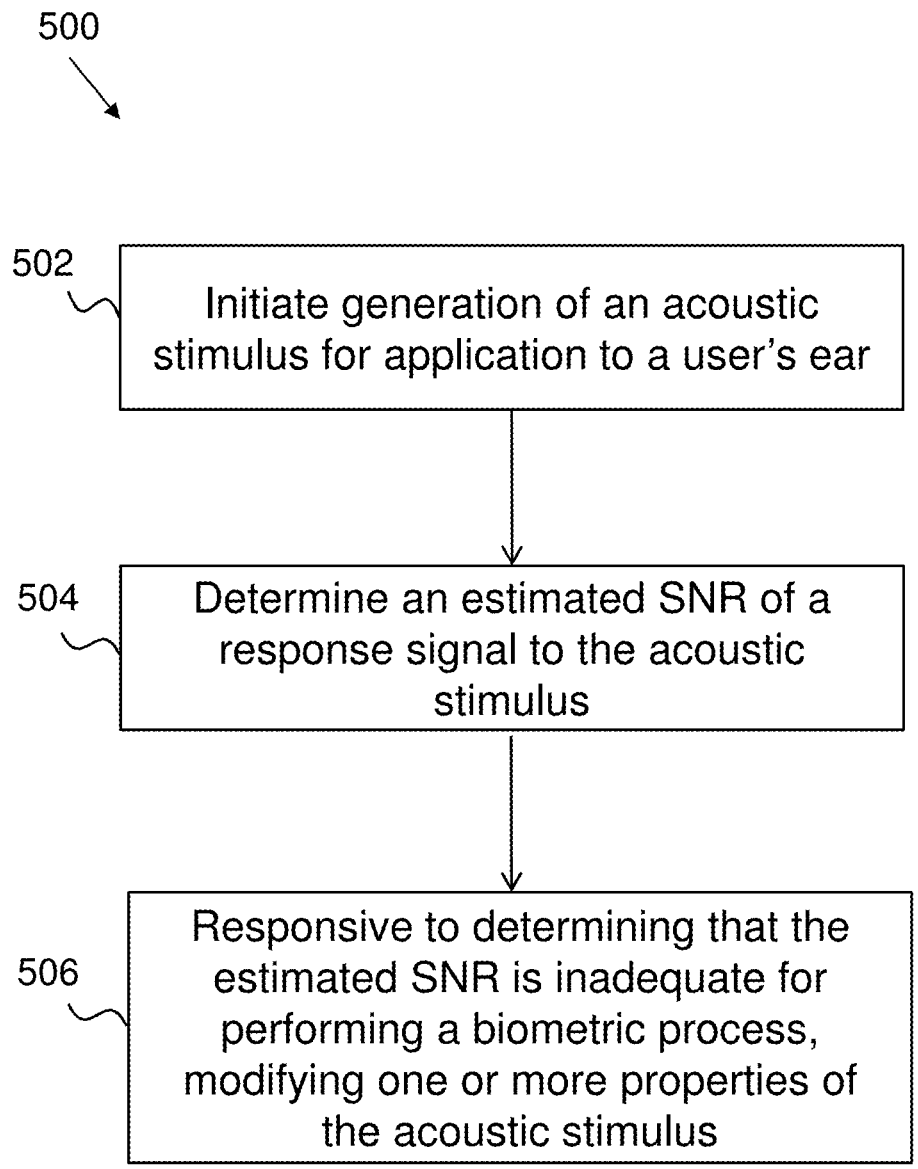
FIG. 5 is a method according to embodiments of the disclosure.

FIG. 5 is a method 500 according to embodiments of the disclosure. The method 500 may be carried out in a biometric system, such as the personal audio device 202, the system 204 or the system 300.

At 502, the system 202, 204, 300 initiates generation of an acoustic stimulus towards a user's ear. The stimulus may be directed towards the outer part of the ear (i.e. the auricle), the ear canal, or both.

At 504, the system 202, 204, 300 determines a quality measure of a response signal to the acoustic stimulus.

At 506, the system 202, 204, 300 modifies one or more properties of the acoustic stimulus and/or cancels the effect of noise from outside the ear on the response signal in response to determining that the quality measure is inadequate for performing a biometric process.

Figure 6:
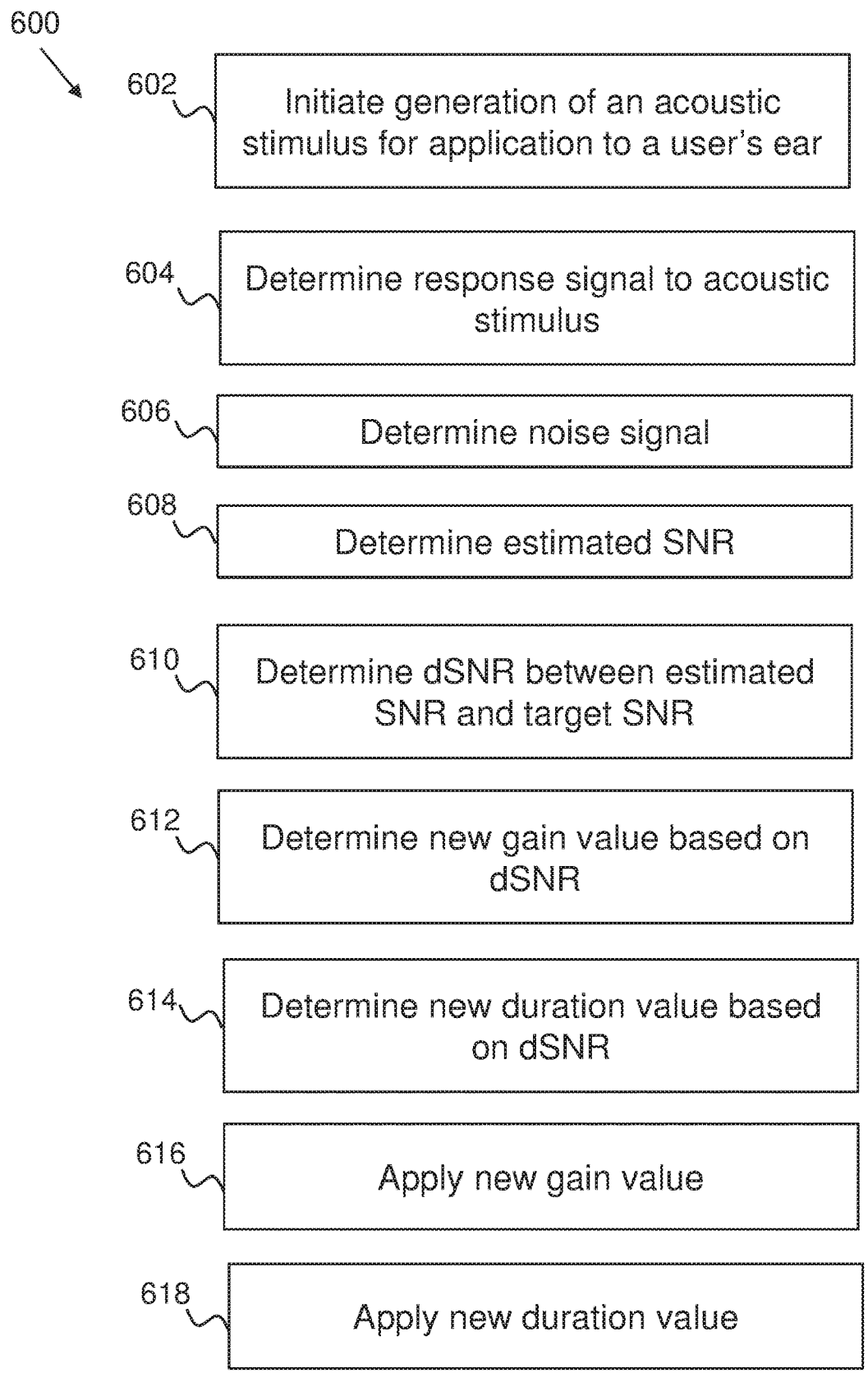
FIG. 6 is a method according to embodiments of the disclosure.

Referring now to FIG. 6, there is shown a method 600 according to embodiments of the disclosure. The method 600 may be carried out in a biometric system, such as the personal audio device 202, the system 204 or the system 300.

At 602, the system 202, 204, 300 initiates generation of an acoustic stimulus towards a user's ear. The stimulus may be directed towards the outer part of the ear (i.e. the auricle), the ear canal, or both. The stimulus may be associated with a duration $T_p$ and a level $G_p$. The duration $T_p$ and a level $G_p$ may be controlled by respective duration control and gain control components of the control module 302. The acoustic stimulus may be applied to the user's ear using loudspeaker 306.

At 604, the system 202, 204, 300 determines a response signal $M_i$ to the acoustic stimulus indicative of the signal level S. The response signal may be captured by in-ear microphone 308, for example.

At 606, the system 202, 204, 300 determines a noise signal $M_e$ indicative of background noise N. The background noise may be captured by out-of-ear microphone 330, for example. The system 202, 204, 300 may be configured to capture the response signal $M_i$ and the noise signal $M_e$ substantially synchronously.

At 608, the system 202, 204, 300 determines a SNR based on the signal level and the noise level. For example, the SNR may be calculated as:

$$SNR=M_i/M_e$$

At 610, the system 202, 204, 300 determines a difference dSNR between the determined SNR and a target SNR.

At 612, the system 202, 204, 300 determines a new gain value $G_{pnew}$, based on the difference dSNR. For example, the difference dSNR may be input to the gain control component of the control module 302 by the decision module 328 and the gain control component may determine the new gain value $G_{pnew}$.

At 616, the system 202, 204, 300 determines a new duration value $L_{pnew}$, based on the difference dSNR. For example, the difference dSNR may be input to the duration control component of the control module 302 by the decision module 328 and the duration control component may determine the new duration value $L_{pnew}$.

At 616, the system 202, 204, 300 applies the new gain value $G_{pnew}$ to the electrical audio signal at a gain module, such as the amplifier 304, to increase the signal level $M_i$. The new gain value $G_{pnew}$ may be exponentially smoothed. In some embodiments, where the difference dSNR is positive and greater than a threshold gain metric, the gain $G_p$ of the acoustic stimulus is reduced and where the difference dSNR is negative and greater than a threshold gain metric, the gain $G_p$ of the acoustic stimulus is increased.

At 618, the system 202, 204, 300 inputs the new duration value $L_{pnew}$ to the acoustic stimulus generator 303 to change the stimulus duration. For example, to increase SNR, the duration value is increased. In some embodiments, the system 202, 204, 300 increases the duration incrementally.

In some embodiments, both the signal level and noise level may be determined from the acoustic stimulus, thereby requiring use of only one microphone 308, as discussed below with reference to FIGS. 7A and 7B and FIGS. 8A and 8B.

Figure 7A:
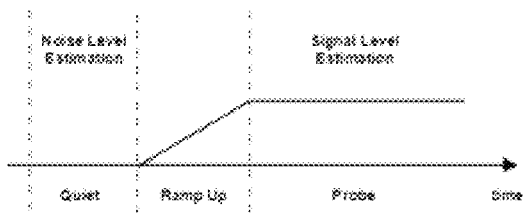
FIG. 7A is a plot of an acoustic stimulus in the time domain according to embodiments of the disclosure.

As illustrated in FIG. 7A, the acoustic stimulus or probe may comprise multiple distinct periods which may be used to determine the signal level and noise level. For example, the acoustic stimulus may comprise a relatively quiet period, which may be used for noise level estimation, a ramp up period to avoid transients, and a probe period, which may be used for noise level estimation.

Figure 7B:
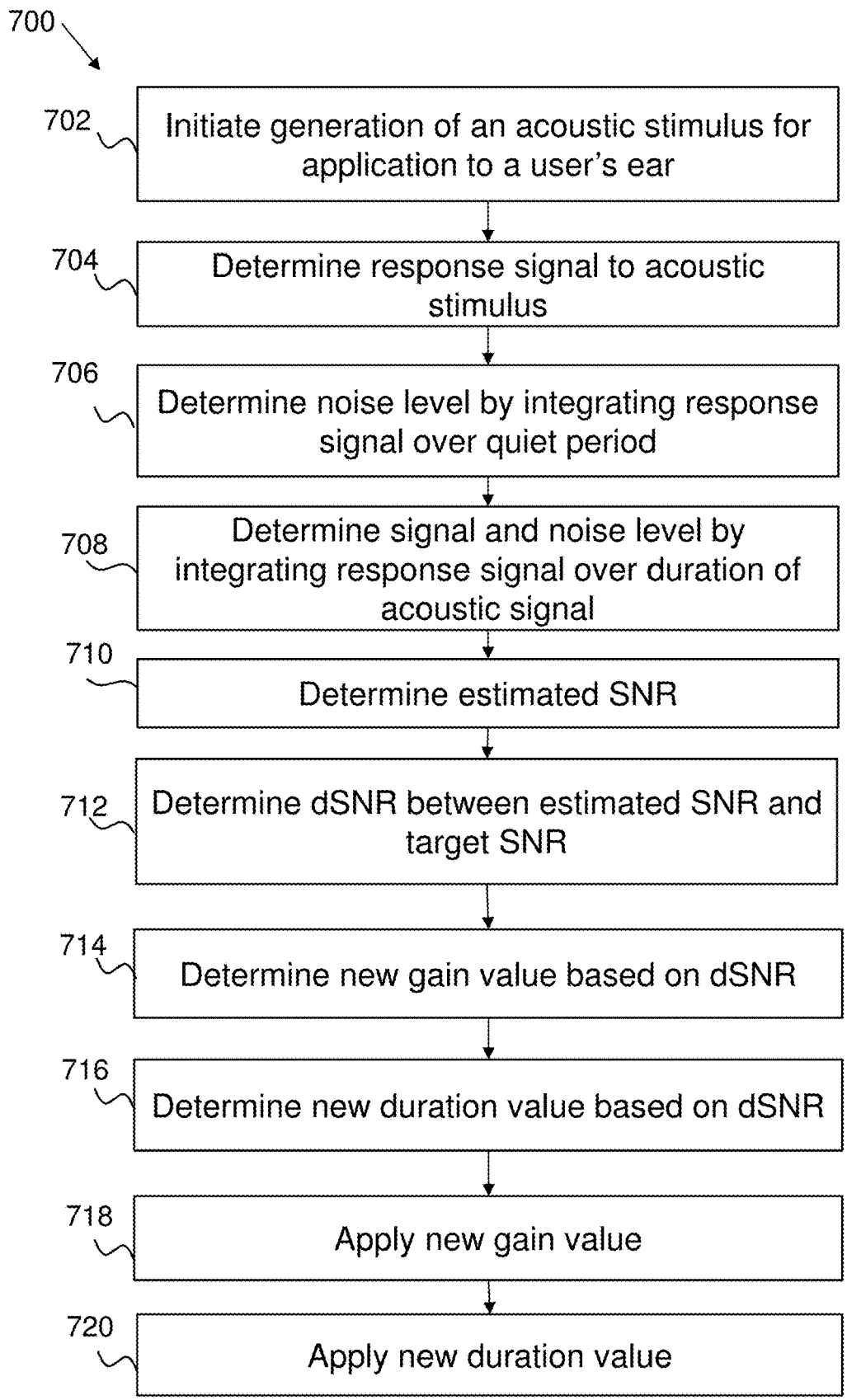
FIG. 7B is a method according to embodiments of the disclosure.

Referring now to FIG. 7B, there is shown a method 700 according to embodiments of the disclosure. The method 700 may be carried out in a biometric system, such as the personal audio device 202, the system 204 or the system 300.

At 702, the system 202, 204, 300 initiates generation of an acoustic stimulus towards a user's ear. The stimulus may be directed towards the outer part of the ear (i.e. the auricle), the ear canal, or both. The stimulus may be associated with a duration $T_p$ and a level $G_p$. The duration $T_p$ and a level $G_p$ may be controlled by respective duration control and gain control components of the control module 302. The acoustic stimulus may be applied to the user's ear using loudspeaker 306.

At 704, the system 202, 204, 300 determines a response signal $M_i$ over duration of the acoustic stimulus. The response signal may be captured by in-ear microphone 308, for example.

At 706, the system 202, 204, 300 determines a noise level N by integrating the response signal $M_i$ over the duration corresponding to the quiet period of acoustic stimulus.

At 708, the system 202, 204, 300 determines a signal and noise level, S+N, by integrating the response signal $M_i$ over the duration of the acoustic stimulus. Integrating the response signal $M_i$ will cause the signal level to be increased while averaging out the noise.

At 710, the system 202, 204, 300 determines the SNR based on the signal and noise level and the noise level. For example, the SNR may be calculated as:

$$SNR=((S+N)/N)-1.$$

The remaining steps of method 700 (712 to 720) correspond with steps 610 to 618.

Figure 8A:
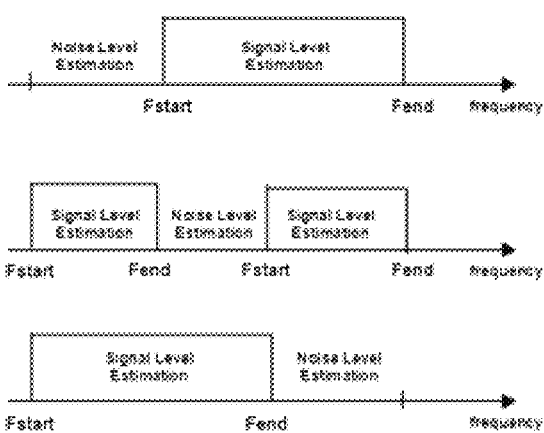
FIG. 8A is a plot of variations of acoustic stimulus in the frequency domain according to embodiments of the disclosure.

As illustrated in FIG. 8A, the acoustic stimulus or probe may comprise multiple distinct frequency ranges which may be used to determine the signal level and noise level. For example, the acoustic stimulus may comprise non-zero spectral content spanned by one or more frequency ranges, for example, frequencies between $F_{start}$ and $F_{end}$, which may be used for noise signal level estimation. Similarly, the acoustic stimulus may comprise zero or substantially empty spectral content spanned by one or more frequency ranges, for example, frequencies outside of $F_{start}$ and $F_{end}$, which may be used for noise level estimation.

Figure 8B:
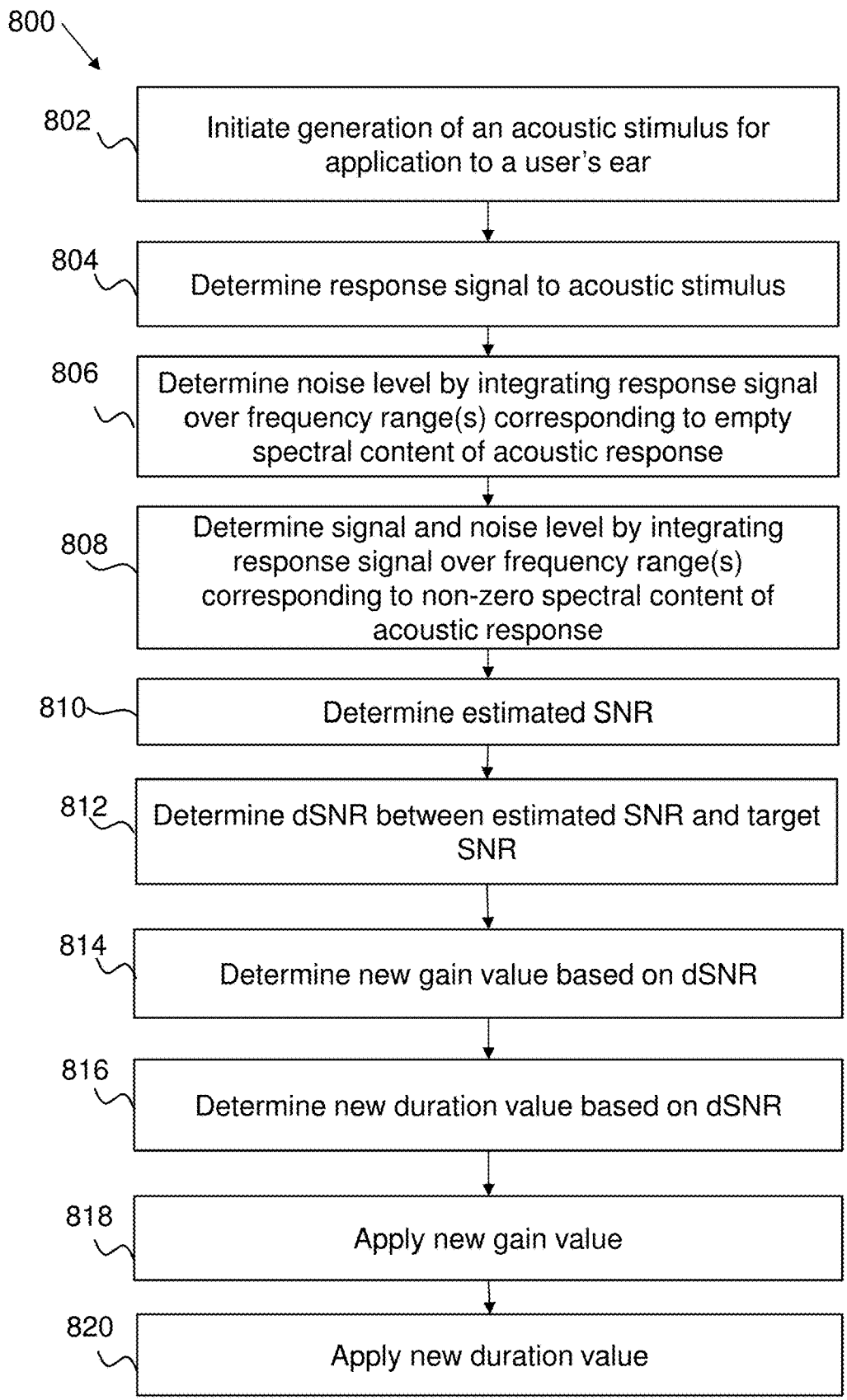
FIG. 8B is a method according to embodiments of the disclosure.

Referring now to FIG. 8B, there is shown a method 800 according to embodiments of the disclosure. The method 800 may be carried out in a biometric system, such as the personal audio device 202, the system 204 or the system 300.

At 802, the system 202, 204, 300 initiates generation of an acoustic stimulus towards a user's ear. The stimulus may be directed towards the outer part of the ear (i.e. the auricle), the ear canal, or both. The stimulus may be associated with a duration $T_p$ and a level $G_p$. The duration $T_p$ and a level $G_p$ may be controlled by respective duration control and gain control components of the control module 302. The acoustic stimulus may be applied to the user's ear using loudspeaker 306.

At 804, the system 202, 204, 300 determines a response signal $M_i$ over duration of the acoustic stimulus. The response signal may be captured by in-ear microphone 308, for example.

At 806, the system 202, 204, 300 determines a noise level N by integrating the response signal $M_i$ over the frequency range(s) corresponding to the empty spectral content of the acoustic stimulus.

At 808, the system 202, 204, 300 determines a signal and noise level, S+N, by integrating the response signal $M_i$ over the frequency range(s) corresponding to the non-zero spectral content of the acoustic stimulus. Integrating the response signal $M_i$ will cause the signal level to be increased while averaging out the noise.

At 810, the system 202, 204, 300 determines the SNR based on the signal and noise level and the noise level. For example, the SNR may be calculated as:

$$SNR=((S+N)/N)-1.$$

The remaining steps of method 800 (812 to 820) correspond with steps 610 to 618.

Thus, systems, apparatus and methods are provided for use in an ear biometric system which considers the SNR of the measured response signal in order to assess whether the measured response signal is suitable or adequate for performing a biometric process.

Embodiments may be implemented in an electronic, portable and/or battery powered host device such as a smartphone, an audio player, a mobile or cellular phone, a handset. Embodiments may be implemented on one or more integrated circuits provided within such a host device. Embodiments may be implemented in a personal audio device configurable to provide audio playback to a single person, such as a smartphone, a mobile or cellular phone, headphones, earphones, etc. See FIGS. 1a to 1e. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments and implementations likewise, with the benefit of this disclosure, will be apparent to those having ordinary skill in the art, and such embodiments should be deemed as being encompassed herein. Further, those having ordinary skill in the art will recognize that various equivalent techniques may be applied in lieu of, or in conjunction with, the discussed embodiments, and all such equivalents should be deemed as being encompassed by the present disclosure.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method operable in a biometric authentication system, the method comprising:
   initiating generation of an acoustic stimulus for application to a user's ear;
   determining a quality measure of a response signal to the acoustic stimulus; and
   responsive to determining that the quality measure is inadequate for performing a biometric process, modifying one or more properties of the acoustic stimulus to improve a signal to noise ratio, SNR, of the response signal;
   wherein determining that the quality measure is inadequate for performing a biometric process comprises comparing the quality measure with a target quality measure; and
   wherein responsive to determining that a difference between the determined quality measure and a target quality measure is positive and greater than a threshold gain metric, reducing the gain of the acoustic stimulus and responsive to determining that the difference between the determined quality measure and the target quality measure is negative and greater than a threshold gain metric, increasing the gain of the acoustic stimulus.

2. The method of claim 1, wherein modifying one or more properties of the acoustic stimulus comprises one or more of:
   (i) increasing the duration of the acoustic stimulus;
   (ii) applying an additional instance of the acoustic stimulus;
   (iii) shifting the pitch of the acoustic stimulus such that content of the response signal is better aligned with the user's ear canal resonances;
   (iv) applying masking noise to the user's ear;
   (v) amplifying ambient noise and/or user voice via hear through mode or sidetone path;
   (vi) using a masking model to add additional content to the acoustic stimulus that us inaudible to the user and increasing the level of the acoustic stimulus;
   (vii) adding harmonic content to the acoustic stimulus and increasing the level of the acoustic stimulus; and
   (viii) adding content to the acoustic stimulus inaudible frequencies and increasing the level of the acoustic stimulus.

3. The method of claim 1, further comprising cancelling the effect of noise from outside the ear on the response signal of the user's ear to the acoustic stimulus by cancelling an out-of-ear microphone signal from an in-ear microphone signal.

4. The method of claim 1, wherein the quality measure is one of: an estimated signal-to-noise ratio, SNR, of the response signal, an estimated signal level of the response signal, and an estimated noise level of the response signal.

5. The method of claim 1, wherein determining that the quality measure is inadequate comprises determining masked signal levels of the response signal at one or more frequencies, wherein the masked signal levels correspond with signal levels of the acoustic stimulus that are inaudible to the user.

6. The method of claim 1, wherein determining that the quality measure is inadequate comprises comparing one or more parameters associated with quality of the response signal to one or more corresponding parameters extracted from a pre-determined ear canal response of the user.

7. The method of claim 1, wherein determining the quality measure comprises determining a noise level indicative of a noise level in the user's ear.

8. The method of claim 7, wherein determining the noise level in the user's ear comprises one of: (i) determining an in-ear signal when no acoustic stimulus is being applied to the user's ear, (ii) determining an in-ear signal once the application of the acoustic stimulus has stopped, or (iii) determining an in-ear signal when the acoustic stimulus is being applied to the user's ear.

9. The method of claim 7, wherein determining the noise level in the user's ear further comprising cancelling the acoustic stimulus from the in-ear signal.

10. The method of claim 7, wherein determining the noise level in the user's ear comprises determining the noise level in the user's ear based on an out-of-ear signal when no acoustic stimulus is being applied to the user's ear and a transfer function between an ear entrance and an internal microphone.

11. The method of claim 7, wherein determining the noise level in the user's ear comprises determining the noise level in the user's ear based on an out-of-ear signal when the acoustic stimulus is being applied to the user's ear and a transfer function between an ear entrance and an internal microphone.

12. The method of claim 11, wherein determining the noise level in the user's ear further comprising cancelling the acoustic stimulus from the out-of-ear signal.

13. The method of claim 7, wherein responsive to determining one or more of: (i) a relatively high noise situation and (ii) wind condition, determining the noise level in the user's ear based on an in-ear signal.

14. The method of claim 7, wherein responsive to determining one or more of: (i) a relatively low noise situation and (ii) noise from the user's mouth, determining the noise level in the user's ear based on an out-of-ear signal.

15. The method of claim 10, wherein the out-of-ear signal is derived from an external microphone external to the user's ear.

16. The method of claim 1, wherein responsive to determining one or more of: (i) a relatively low noise situation and (ii) a transfer function of the in-ear transducer being variable, determining a t signal level indicative of the response signal based on the determined response signal of the user's ear to the acoustic stimulus.

17. The method of claim 1, wherein the acoustic stimulus comprises a quiet period, a ramp-up period and a probe period, and wherein determining the quality measure comprises determining a noise level from a corresponding quiet period of the response signal, and determining a signal and noise level from a corresponding probe period of the response signal.

18. The method of claim 1, wherein the acoustic stimulus comprises non-zero spectral content associated with a first set of one or more frequency ranges and zero spectral content associated with a second set of one or more frequency ranges and wherein determining the quality measure comprises determining a noise level from the response signal at the second set of one or more frequency ranges, and determining a signal and noise level from the response signal at the first set of one or more frequency ranges.

19. An electronic apparatus, comprising processing circuitry and a non-transitory machine-readable medium storing instructions which, when executed by the processing circuitry, cause the electronic apparatus to:

initiate generation of an acoustic stimulus for application to a user's ear;

determine a quality measure of a response signal to the acoustic stimulus; and responsive to determining that the quality measure is inadequate for performing a biometric process, modify one or more properties of the acoustic stimulus to improve a signal to noise ratio, SNR, of the response signal;

wherein determining that the quality measure is inadequate for performing a biometric process comprises comparing the quality measure with a target quality measure; and wherein responsive to determining that a difference between the determined quality measure and a target quality measure is positive and greater than a threshold gain metric, reduce the gain of the acoustic stimulus and responsive to determining that the difference between the determined quality measure and the target quality measure is negative and greater than a threshold gain metric, increase the gain of the acoustic stimulus.

20. A non-transitory machine-readable medium storing instructions which, when executed by processing circuitry, cause an electronic apparatus to:

initiate generation of an acoustic stimulus for application to a user's ear;

determine a quality measure of a response signal to the acoustic stimulus; and responsive to determining that the quality measure is inadequate for performing a biometric process, modify one or more properties of the acoustic stimulus to improve a signal to noise ratio, SNR, of the response signal;

wherein determining that the quality measure is inadequate for performing a biometric process comprises comparing the quality measure with a target quality measure; and wherein responsive to determining that a difference between the determined quality measure and a target quality measure is positive and greater than a threshold gain metric, reduce the gain of the acoustic stimulus and responsive to determining that the difference between the determined quality measure and the target quality measure is negative and greater than a threshold gain metric, increase the gain of the acoustic stimulus.

* * * * *

UNITED STATES PATENT AND TRADEMARK OFFICE
CERTIFICATE OF CORRECTION

PATENT NO. : 10,970,575 B2
APPLICATION NO. : 16/833935
DATED : April 6, 2021
INVENTOR(S) : Harvey et al.

Page 1 of 1

It is certified that error appears in the above-identified patent and that said Letters Patent is hereby corrected as shown below:

In the Claims

In Column 20, Line 49, Claim 2, delete "that us" and insert -- that is --, therefor.

In Column 21, Line 51, Claim 16, delete "a t signal" and insert -- a signal --, therefor.

Signed and Sealed this
Eighth Day of November, 2022

Katherine Kelly Vidal
*Director of the United States Patent and Trademark Office*